3,261,338
VALVE TIMING MECHANISM
Anatoly A. Arutunoff and H. Bryon Crow, both of Bartlesville, Okla., assignors to Automobile Racing Club of Oklahoma, Inc., Cherokee, Okla., a corporation of Oklahoma
Filed July 13, 1964, Ser. No. 382,199
5 Claims. (Cl. 123—90)

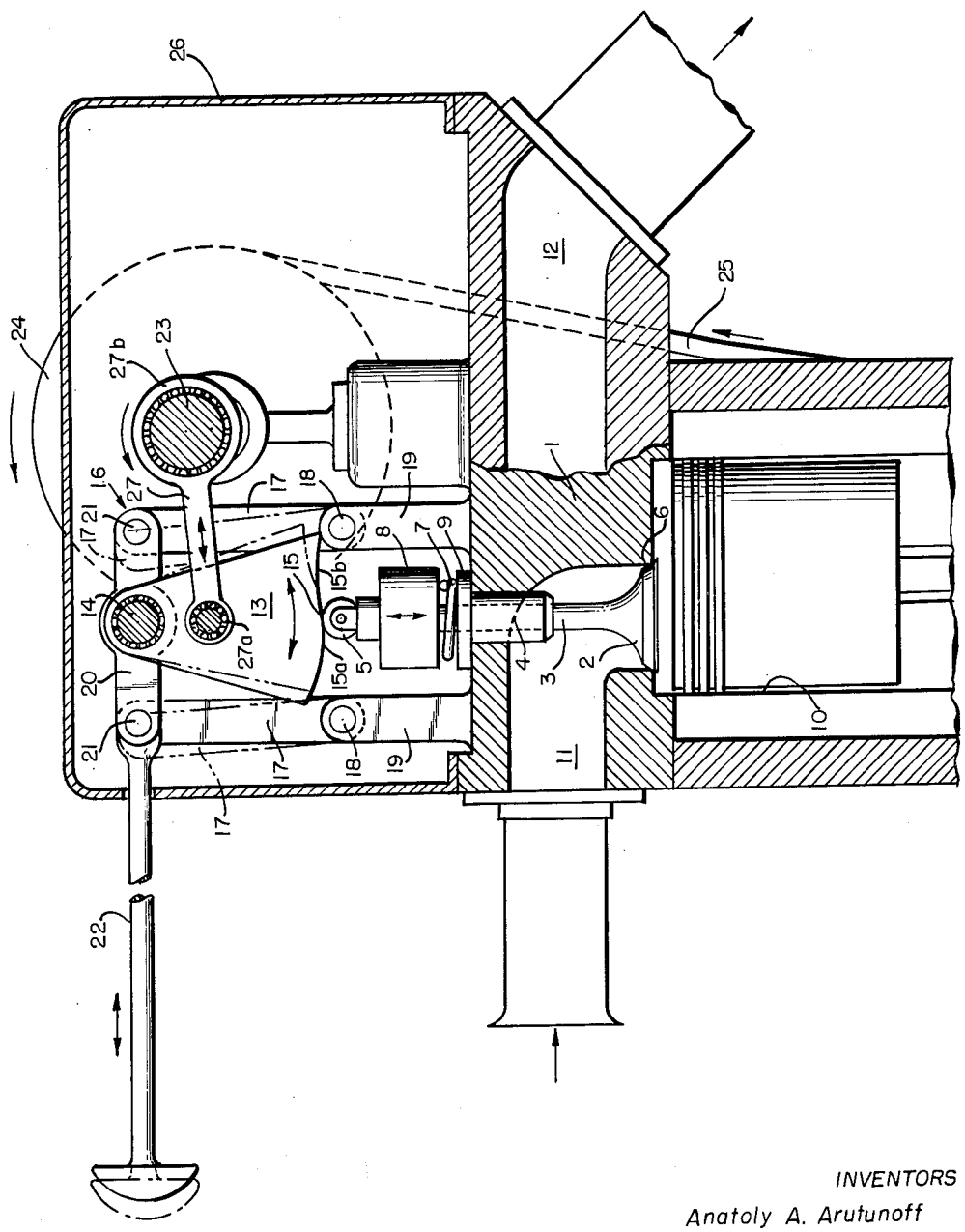

This invention relates generally to valve trains for internal combustion engines and consists more particularly in new and useful improvements in a variable valve timing and lift mechanism for overhead valve-type engines having reciprocably mounted intake and exhaust valves in the cylinder head, arranged with their stems aligned and projecting outwardly from the engine cylinders. Because of the fact that the valve timing required for optimum performance of an engine at high speeds is not suitable for efficient operation at low engine speeds or idling speed, and likewise, the valve timing designed for low speed engine operation is not efficient at high speeds, most internal combustion engines are provided with a valve timing mechanism designed for the best performance within a moderate speed range. Thus, these conventional timing mechanisms are not capable of reaching high speeds with efficient operation and the development of all potentially available power of the engine is necessarily sacrificed. For high speeds, an early opening and late closing of the exhaust valves is essential, as is also an early opening and late closing of the intake valves.

The primary object of the present invention is to provide a valve timing mechanism for overhead type engines, including means for varying the timing and lift of the valves to accommodate a range of speeds from high to low while the engine is in operation.

Another object of the invention is to provide a cam-actuated valve system having no rocker arms and including means for selectively varying the relationship of the cams with respect to the valve tappets.

A further object of the invention is to provide a valve timing mechanism of the above type, including a minimum of parts without sacrificing efficiency of operation.

A still further object is to provide a valve timing mechanism actuated by a series of cams having predetermined, undulating lobe contours which, upon lateral shifting of the common axis of the cams, selectively regulates the timing and lift effected by the operative engagement of the cam lobes with the valve tappets.

Still another object of the invention is to provide a valve timing mechanism including a series of cams mounted for oscillation on a common shaft or axis, and respectively arranged for operative engagement with an underlying series of valve stems or tappets, said common shaft being mounted on an adjustable supporting assembly which is shiftable laterally to vary the relationship of the axis of said shaft with respect to the valve tappets, to thereby vary the timing and extent of the engagement of the cam lobes with the respective valve tappets.

With the above and other objects in view which will appear as the description proceeds, the invention consists in the novel features herein set forth, illustrated in the accompanying drawings, and more particularly pointed out in the appended claims.

The single figure of the drawing more or less diagrammatically illustrates the valve timing and lift control mechanism of the invention as viewed in cross-section through a conventional internal combustion engine cylinder head.

In the drawing which, for the sake of simplicity, illustrates only one of a series of valves and timing cams, 1 represents a conventional internal combustion engine cylinder head provided with the usual valves 2, the stems 3 of which project upwardly through valve guides 4 and carry roller follower valve tappets 5 at their upper extremities. The valves are normally urged to closed position in valve seats 6, by suitable coil springs 7 interposed between enlargements 8 on the valve stems and supporting collars 9 abutting the top of the cylinder head. Each of the cylinders 10 is provided with an inlet port 11 and an exhaust port 12, controlled by their respective valves 2, in the usual manner.

Surmounting the respective valve tappets 5 are a series of oscillating cam members 13 mounted on a common axis or shaft 14 at their upper extremities, their diverging lower extremities being contoured to provide undulating lobes 15 designed to oscillate in operative contact with the rollers of respective tappets 5. As seen in the drawing, each of the cam lobes is contoured to provide contiguous high and low cam areas 15a and 15b respectively, for the purpose hereinafter described.

The cam axis or shaft 14 extends longitudinally above the cylinder block and is supported by a frame assembly 16, substantially in the form of a pivoted parallelogram. This frame preferably comprises laterally spaced uprights 17 pivotally connected at their lower ends as at 18, to vertical posts 19 which are supported on the cylinder head. The uprights 17 are connected at their upper extremities by a cross-bar 20 by suitable pivots 21. It is, of course, understood that while only one cam 13 is shown in the drawing, there is one cam for each of the intake and exhaust valves of the respective engine cylinders, and when the shaft 14 is shifted laterally in either direction, by a corresponding shifting of the frame 16, the operative relationship of each of the cams with respect to the cam followers or tappets, is accordingly varied, as will later appear. Any suitable means, such as a manual control rod 22, extending through the engine housing 26 and connected to the frame 16, may be employed for selectively varying the position of the cam axis 14. Also, the shifting of this frame may be under the control of a suitable governor and thus automatically adjustable by the speed of the engine.

The oscillation of the cams 13 is effected by means of an eccentric crankshaft 23, driven by a sheave 24 which, in turn, is rotated by a notch belt or timing chain 25 connected to the engine drive shaft (not shown), and designed to rotate the crankshaft 23 at one-half the engine shaft speed. The respective cams 13 are operatively connected to the crankshaft 23 by means of actuating rods 27, opposite ends of which are rotatably secured at intermediate points on the cams and to the eccentric portions of the crankshaft, by suitable bearing assemblies 27a and 27b, respectively. Thus, upon rotation of the crankshaft 23 through sheave 24 and timing chain 25, the cams 13 are caused to oscillate on the common shaft 14 with a resultant oscillating engagement of the cam lobes 15 with the respective tappets or followers 5.

It will be understood that the spacing and arrangement of cams is such that all of the intake valve tappets of the engine and all of the exhaust valve tappets are operated in the proper sequence and that the lateral adjustment of the cam supporting shaft 14 simultaneously varies the timing and lift of the entire set of valves.

It will be apparent from the drawing that due to the pivotal connections of the various members of the frame 16, a shifting of the frame to right or left, as viewed in the drawing, causes the cam supporting shaft 14 to move toward or away from the axis of the crankshaft 23, while at the same time, undergoing a slight arcuate movement around the axes of the roller followers of the valve tappets 5. In any of the sequential adjustments of the shaft 14, the axis of the latter must be equidistant from the axis common to all of the roller followers on the valve tappets 5 to insure contact while the shaft 14 is moving nearer to or further from the axis of the crankshaft 23.

In operation, with the parts in the positions shown in full lines in the drawing, where the cam 13 is in an intermediate position, the counter-clockwise rotation of the sheave 24 and crankshaft 23 will cause the cam 13 to swing to the left on its supporting shaft 14, thus gradually bringing the high point 15b of the cam lobe in position over the roller follower 5. When this high point is reached, the valve 2 is completely closed under the influence of the spring 7. The continued counter-clockwise rotation of the sheave 24 and crankshaft 23 reverses the direction of swing of the cam 13 and pulls it toward the right to thus gradually bring the low point 15a into contact with the roller follower 5. Through the camming action of the low point 15a on the roller follower 5, the valve 2 is caused to move downwardly into open position and this sequence is followed in timed relation throughout the series of cams and tappets.

By adjusting the frame 16 and cam supporting shaft 14 to the left in the drawing, and into the position shown in dotted lines, for example, it will be seen that the shaft 14 is moved a greater distance away from the crankshaft 23, while, at the same time, describing a slight arcuate movement, as previously stated. With the frame thus adjusted to the left, a greater extent of movement of the connecting arm 27 toward the left is required to bring the high point 15b of the cam lobe into position to permit a given valve opening, thereby retarding the valve timing. In other words, the extent of lateral adjustment of the frame 16 and shaft 14 to the right or left determines the extent of acceleration a retardment of the valve timing in opening and closing the valves.

It will also be apparent that due to the undulating contour of the cam lobe 15, the adjustment of the frame 16 and cam supporting shaft 14, in addition to varying the timing of the valve opening and closing, also regulates the lift or extent of opening of the respective valves.

From the foregoing, it is believed that the invention may be readily understood by those skilled in the art without further description, it being borne in mind that numerous changes may be made in the details disclosed without departing from the spirit of the invention as set forth in the following claims.

We claim:

1. A valve timing mechanism for internal combustion engines including a series of valves respectively provided with projecting valve tappets; said timing mechanism comprising a series of cam elements rotatably suspended for independent oscillating movement on a common overhead supporting shaft, said shaft being carried by a pivotally mounted parallelogram frame, said cam elements being positioned on said shaft to present their respective lobes in sliding contact with said valve tappets, an eccentric crankshaft parallel with and laterally spaced from said supporting shaft, connecting rods between respective cam elements and said crankshaft, drive means for said crankshaft operatively connected with the drive shaft of said engine, and means for laterally adjusting the position of said supporting shaft for varying the spacing of the axis of said supporting shaft with respect to those of said crankshaft and valves, to thereby vary the timing and extent of oscillating movement of said cam elements with respect to said valve tappets and, in turn, the timing of the operation of said valves.

2. A timing mechanism as claimed in claim 1, wherein the drive means for said crankshaft is rotated at one-half the speed of the drive shaft of said engine.

3. A timing mechanism as claimed in claim 1, wherein said cam elements are suspended from said supporting shaft at one end, the opposite ends of respective cam elements forming cam lobes contoured to provide contiguous high and low camming areas, to thereby alternately open and close said valves through sliding contact with said valve tappets.

4. A timing mechanism as claimed in claim 1, wherein said means for laterally adjusting said supporting shaft comprises means connected to said frame for laterally adjusting said frame with respect to said crankshaft.

5. Apparatus as claimed in claim 4, wherein said frame is substantially in the form of a pivotally assembled parallelogram, the upper portion of which carries said supporting shaft.

References Cited by the Examiner

UNITED STATES PATENTS

| 1,395,851 | 11/1921 | McLean | 123—90 |
| 2,097,883 | 11/1937 | Johansson | 123—90 |
| 2,266,077 | 12/1941 | Roan | 123—90 |
| 2,832,327 | 4/1958 | Lorenz | 123—90 |
| 2,954,017 | 9/1960 | Forstner | 123—90 |

FOREIGN PATENTS

| 1,284,700 | 1/1962 | France. |
| 311,884 | 4/1919 | Germany. |

MARK M. NEWMAN, *Primary Examiner.*

A. L. SMITH, *Assistant Examiner.*